United States Patent
Swan et al.

(10) Patent No.: US 10,778,043 B2
(45) Date of Patent: Sep. 15, 2020

(54) HIGH FREQUENCY WIRELESS POWER TRANSMISSION SYSTEM

(71) Applicant: Ossia Inc., Bellevue, WA (US)

(72) Inventors: Philip L. Swan, Redmond, WA (US); Dale D. Mayes, Bothell, WA (US); Hatem I. Zeine, Bellevue, WA (US); Douglas Wayne Williams, Seattle, WA (US)

(73) Assignee: OSSIA INC., Bellevue, WA (US)

(*) Notice: Subject to any disclaimer, the term of this patent is extended or adjusted under 35 U.S.C. 154(b) by 1 day.

(21) Appl. No.: 16/429,938

(22) Filed: Jun. 3, 2019

(65) Prior Publication Data

US 2019/0372400 A1 Dec. 5, 2019

Related U.S. Application Data

(60) Provisional application No. 62/679,464, filed on Jun. 1, 2018.

(51) Int. Cl.
| | |
|---|---|
| H02J 50/40 | (2016.01) |
| H04L 27/227 | (2006.01) |
| H02J 50/80 | (2016.01) |
| H01Q 21/28 | (2006.01) |
| H04L 7/04 | (2006.01) |

(52) U.S. Cl.
CPC ............ *H02J 50/40* (2016.02); *H01Q 21/28* (2013.01); *H02J 50/80* (2016.02); *H04L 7/04* (2013.01); *H04L 27/2272* (2013.01)

(58) Field of Classification Search
CPC .. H02J 17/00; H02J 7/025; H02J 50/40; H02J 50/80; H01Q 21/28; H04L 7/04; H04L 27/2272
See application file for complete search history.

(56) References Cited

U.S. PATENT DOCUMENTS

2016/0099757 A1* 4/2016 Leabman ................ H02J 50/23
 307/104
2019/0140487 A1 5/2019 Zeine et al.

OTHER PUBLICATIONS

Samuel A. Rotenberg et al., An Efficient Rectifier for an RDA Wireless Power Transmission System Operating at 2.4GHz, (32nd URSI GASS) Aug. 19-26, 2017, Montreal, Canada.
U.S. Appl. 15/852,348, filed Dec. 22, 2017, Zeine et al., not yet published.

* cited by examiner

*Primary Examiner* — Carlos Amaya
(74) *Attorney, Agent, or Firm* — Volpe and Koenig, P.C.

(57) ABSTRACT

Described herein are embodiments of apparatuses and methods a wireless power transmission system (WPTS) receiving encoded beacon information from a wireless power receiver client (WPRC) and transmitting focused, directional wireless power to the WPRC.

20 Claims, 12 Drawing Sheets

HIGH FREQUENCY WIRELESS POWER TRANSMISSION SYSTEM

CROSS REFERENCE TO RELATED APPLICATION

This application claims the benefit of U.S. Provisional Application No. 62/679,464 filed Jun. 1, 2018, which is incorporated by reference as if fully set forth.

FIELD OF INVENTION

The embodiments described herein provide high frequency wireless power transmission system (WPTS) architectures suitable for delivering focused, directional wireless power to one or more wireless power receiver clients (WPRCs).

BACKGROUND

A typical WPTS may comprise thousands of antennas to transmit accurate, focused, directional power to one or more WPRCs. In a point-to-point architecture, as the number of antennas increases, the number of connections between the individual antennas and a central controller increases. Such a point-to-point architecture may be expensive to manufacture due to the increased connections. Intermediate collector chips may be added to the point-to-point architecture, but adding these intermediate collector chips would also increase manufacturing costs. As such, there is a need for an architecture that scales well to accommodate an increased number of antennas without significantly driving up manufacturing costs.

SUMMARY

Described herein are embodiments of a WPTS and a WPRC and methods of operation thereof. In some embodiments, a WPTS may include an antenna array controller, a plurality of antenna controllers, and a daisy chain bus coupling the antenna array controller and the plurality of antenna controllers. In some embodiments, each antenna controller of the plurality of antenna controllers may be coupled to a respective plurality of antennas. In some embodiments, the antenna array controller may be configured to control the antenna controllers to receive a phase beacon from the WPRC and to transmit wireless power to the WPRC based on information encoded in the phase beacon.

In some embodiments, the daisy chain bus may be a differential pair.

In some embodiments, each antenna controller of the plurality of antenna controllers may include a plurality of antenna management units (AMUs). In some embodiments, each AMU may include one of the respective plurality of antennas and a single phase locked loop (PLL) may be shared across the one or more AMUs.

In some embodiments, the AMU may be configured to, when operating in a receive mode, detect phase information from the received phase beacon. In some embodiments, the AMU may be configured to, when operating in a transmit mode, program a phase of a phase shifter based on a complex conjugate of the phase information and transmit wireless power to the WPRC via the phase shifter.

In some embodiments, each antenna controller of the plurality of antenna controllers may be configured to update a payload list indicating the information encoded in the phase beacon and forward the updated payload list on the daisy chain bus.

In some embodiments, the updated payload list may include a count indicating how many antennas received the information encoded in the phase beacon. In some embodiments, the information encoded in the phase beacon may include a WPRC ID. In some embodiments, the updated payload list may include a list of one or more received WPRC IDs.

In some embodiments, each antenna controller of the plurality of antenna controllers may be configured to receive a timing beacon prior to the phase beacon. In some embodiments, the timing beacon may be received on a frequency that is offset from a frequency used to transmit the wireless power.

In some embodiments, the antenna array controller may be further configured to control the plurality of antenna controllers to halt transmission of wireless power during a time slot corresponding to an expected receive time of the phase beacon.

In some embodiments, the antenna array controller may be further configured to send a command message to the plurality of antenna controllers using a command bus synchronized with a reference clock. In some embodiments, the command message may be synchronized with a divided-down version of the reference clock. In some embodiments, the command message may be synchronized with an integer divided-down version of the reference clock.

In some embodiments, each antenna controller of the plurality of antenna controllers may include a phase locked loop. In some embodiments, the command message may be used to synchronized phase locked loops across the plurality of antenna controllers.

In some embodiments, the antenna array controller may be configured to determine a number of the plurality of antenna controllers coupled to the daisy chain bus based on a message that propagates through the plurality of antenna controllers and is returned to the antenna array controller. In some embodiments, a value included in the message may be incremented by each antenna controller of the plurality of antenna controllers. In some embodiments, the antenna array controller may be further configured to determine the number of the plurality of antenna controllers based on the value that is returned to the antenna array controller.

In some embodiments, the wireless power may be transmitted in an industrial, scientific, and medical (ISM) band at 2.4 GHz, 5.8 GHz, 24 GHz, or 60 GHz.

In some embodiments, a WPTS may receive one or more phase beacon payloads at an antenna controller via a first set of antennas. In some embodiments, on a condition that a phase beacon payload of the one or more phase beacon payloads matches a payload in a payload list, the WPTS may increment a count corresponding to the payload in the payload list. In some embodiments, on a condition that the phase beacon payload does not match a payload in the payload list, the WPTS may add an indication of the phase beacon payload to the payload list. In some embodiments, the WPTS may forward the payload list on a daisy chain bus to a next antenna controller or to an antenna array controller and transmit wireless power based on the payload list.

In some embodiments, on the condition that the phase beacon payload matches the payload in the payload list, the WPTS may increment the count corresponding to the payload in the payload list based on how many antennas of the first set of antennas received the phase beacon payload.

In some embodiments, the phase beacon payload may include a WPRC ID. In some embodiments, the phase beacon payload may include an indication of a state of charge of a WPRC.

DETAILED DESCRIPTION OF THE PREFERRED EMBODIMENTS

Figure 1:
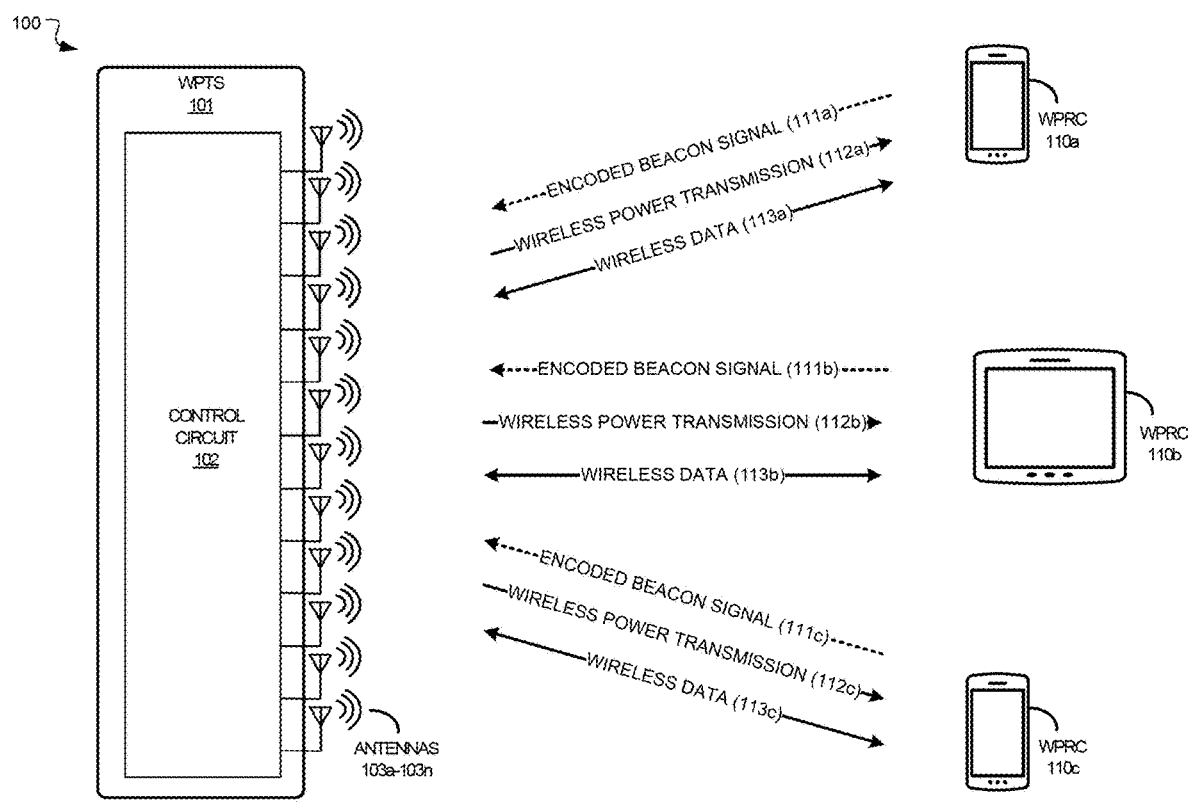
FIG. 1 depicts a system diagram including an example wireless power transmission environment.

FIG. 1 depicts a system diagram including an example wireless power transmission environment 100 illustrating wireless power delivery from one or more WPTSs, such as WPTS 101. More specifically, FIG. 1 illustrates power transmission to one or more WPRCs 110a-110c. WPTS 101 may be configured to receive encoded beacons 111a-111c from WPRCs 110a-110c and transmit wireless power 112a-112c to WPRCs 110a-110c. Wireless data 113a-113c may also be bidirectionally exchanged between WPTS 101 and WPRCs 110a-110c. WPRCs 110a-110c may be configured to receive and process wireless power 112a-112c and wireless data 113a-113c from one or more WPTSs, such as WPTS 101. Components of an example WPTS 101 are shown and discussed in greater detail below, as well as in FIG. 2. Components of an example WPRC 110a-110c are shown and discussed in greater detail with reference to FIG. 3.

WPTS 101 may include multiple antennas 103a-103n, e.g., an antenna array including a plurality of antennas, which may be capable of delivering wireless power 112a-112c to WPRCs 110a-110c. Antennas 103a-103n may further include one or more timing acquisition antennas and one or more communication antennas. In some embodiments, the same antennas for transmission of wireless power may be used for timing acquisition and wireless data communication. In alternative embodiments, separate antennas may be used for wireless power, for timing acquisition, and for wireless data communication. In some embodiments, the antennas are adaptively-phased radio frequency (RF) antennas. The WPTS 101 may be capable of determining the appropriate phases with which to deliver a coherent power transmission signal to WPRCs 110a-110c. Each antenna of the antenna array including antennas 103a-103n may be configured to emit a signal, e.g. a continuous wave or pulsed power transmission signal, at a specific phase relative to each other antenna, such that a coherent sum of the signals transmitted from a collection of the antennas is focused at a location of a respective WPRC 110a-110c. Any number of antennas may be employed in the reception and transmission of signals depicted in FIG. 1. Multiple antennas, including a portion of antennas 103a-103n that may include all of antennas 103a-103n, may be employed in the transmission and/or reception of wireless signals. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital circuits and modems.

As illustrated in the example of FIG. 1, antennas 103a-103n may be included in WPTS 101 and may be configured to transmit both power and data and to receive data. The antennas 103a-103n may be configured to provide delivery of wireless radio frequency power in a wireless power transmission environment 100, to provide data transmission, and to receive wireless data transmitted by WPRCs 110a-110c, including encoded beacon signals 111a-111c. In some embodiments, the data transmission may be through lower power signaling than the wireless radio frequency power transmission. In some embodiments, one or more of the antennas 103a-103n may be alternatively configured for data communications in lieu of wireless power delivery. In some embodiments, one or more of the power delivery antennas 103a-103n can alternatively or additionally be configured for data communications in addition to or in lieu of wireless power delivery. The one or more data communication antennas are configured to send data communications to and receive data communications from WPRCs 110a-110c.

Each of WPRCs 110a-110c may include one or more antennas (not shown) for transmitting signals to and receiving signals from WPTS 101. Likewise, WPTS 101 may include an antenna array having one or more antennas and/or sets of antennas, each antenna or set of antennas being capable of emitting continuous wave or discrete (pulse) signals at specific phases relative to each other antenna or set of antennas. As discussed above, WPTSs 101 is capable of determining the appropriate phases for delivering the coherent signals to the antennas 103a-103n. For example, in some embodiments, delivering coherent signals to a particular WPRC can be determined by computing the complex conjugate of a received encoded beacon signal at each antenna of the array or each antenna of a portion of the array such that a signal from each antenna is phased appropriately relative to a signal from other antennas employed in delivering power or data to the particular WPRC that transmitted the beacon signal. The WPTS 101 can be configured to emit a signal (e.g., continuous wave or pulsed transmission signal) from multiple antennas using multiple waveguides at a specific phase relative to each other. Other techniques for delivering a coherent wireless power signal are also applicable such as, for example, the techniques discussed in U.S. patent application Ser. No. 15/852,216 titled "Anytime Beaconing In A WPTS" filed Dec. 22, 2017 and in U.S. patent application Ser. No. 15/852,348 titled "Transmission Path Identification based on Propagation Channel Diversity" filed Dec. 22, 2017; which are expressly incorporated by reference herein.

Although not illustrated, each component of the wireless power transmission environment 100, e.g., WPRCs 110a-110c, WPTS 101, can include control and synchronization mechanisms, e.g., a data communication synchronization module. WPTS 101 can be connected to a power source such as, for example, a power outlet or source connecting the WPTSs to a standard or primary alternating current (AC) power supply in a building. Alternatively, or additionally, WPTS 101 can be powered by a battery or via other mechanisms, e.g., solar cells, etc.

As shown in the example of FIG. 1, WPRCs 110a-110c include mobile phone devices and a wireless tablet. However, WPRCs 110a-110c can be any device or system that needs power and is capable of receiving wireless power via one or more integrated WPRCs. Although three WPRCs 110a-110c are depicted, any number of WPRCs may be supported. As discussed herein, a WPRC may include one or more integrated power receivers configured to receive and process power from one or more WPTSs and provide the power to the WPRCs 110a-110c or to internal batteries of the WPRCs 110a-110c for operation thereof.

As described herein, each of the WPRCs 110a-110c can be any system and/or device, and/or any combination of devices/systems that can establish a connection with another device, a server and/or other systems within the example wireless power transmission environment 100. In some embodiments, the WPRCs 110a-110c may each include displays or other output functionalities to present or transmit data to a user and/or input functionalities to receive data from the user. By way of example, WPRC 110a can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, WPRC 110a can also be any wearable device such as watches, necklaces, rings or even devices embedded on or within the customer. Other examples of WPRC 110a include, but are not limited to, a safety sensor, e.g. a fire or carbon monoxide sensor, an electric toothbrush, an electronic door lock/handle, an electric light switch controller, an electric shaver, an electronic shelf label (ESL), etc.

Although not illustrated in the example of FIG. 1, the WPTS 101 and the WPRCs 110a-110c can each include a data communication module for communication via a data channel. Alternatively, or additionally, the WPRCs 110a-110c can direct antennas to communicate with WPTS 101 via existing data communications modules. In some embodiments, the WPTS 101 can have an embedded Wi-Fi hub for data communications via one or more antennas or transceivers. In some embodiments, the antennas 103a-103n can communicate via Bluetooth™, Wi-Fi™, ZigBee™, etc. The WPRCs 110a-110c may also include an embedded Bluetooth™, Wi-Fi™, ZigBee™, etc. transceiver for communicating with the WPTS 101. Other data communication protocols are also possible. In some embodiments the beacon signal, which is primarily referred to herein as a continuous waveform, can alternatively or additionally take the form of a modulated signal and/or a discrete/pulsed signal.

WPTS 101 may also include control circuit 102. Control circuit 102 may be configured to provide control and intelligence to the WPTS 101 components. Control circuit 102 may comprise one or more processors, memory units, etc., and may direct and control the various data and power communications. Control circuit 102 may direct data communications on a data carrier frequency that may be the same or different than the frequency via which wireless power is delivered. Likewise, control circuit 102 can direct wireless transmission system 100 to communicate with WPRCs 110a-110c as discussed herein. The data communications can be, by way of example and not limitation, Bluetooth™, Wi-Fi™, ZigBee™, etc. Other communication protocols are possible.

It is appreciated that the use of the term "WPTS" does not necessarily limit the WPTS to any specific structure. That is, the WPTS does not need to be structured in a specific form or geometry. Furthermore, as used herein the term "transmission system" or "WPTS" may be used to include related and peripheral circuitry for signal generation, reception and transmission, such as radios, digital circuits and modems.

Figure 2:
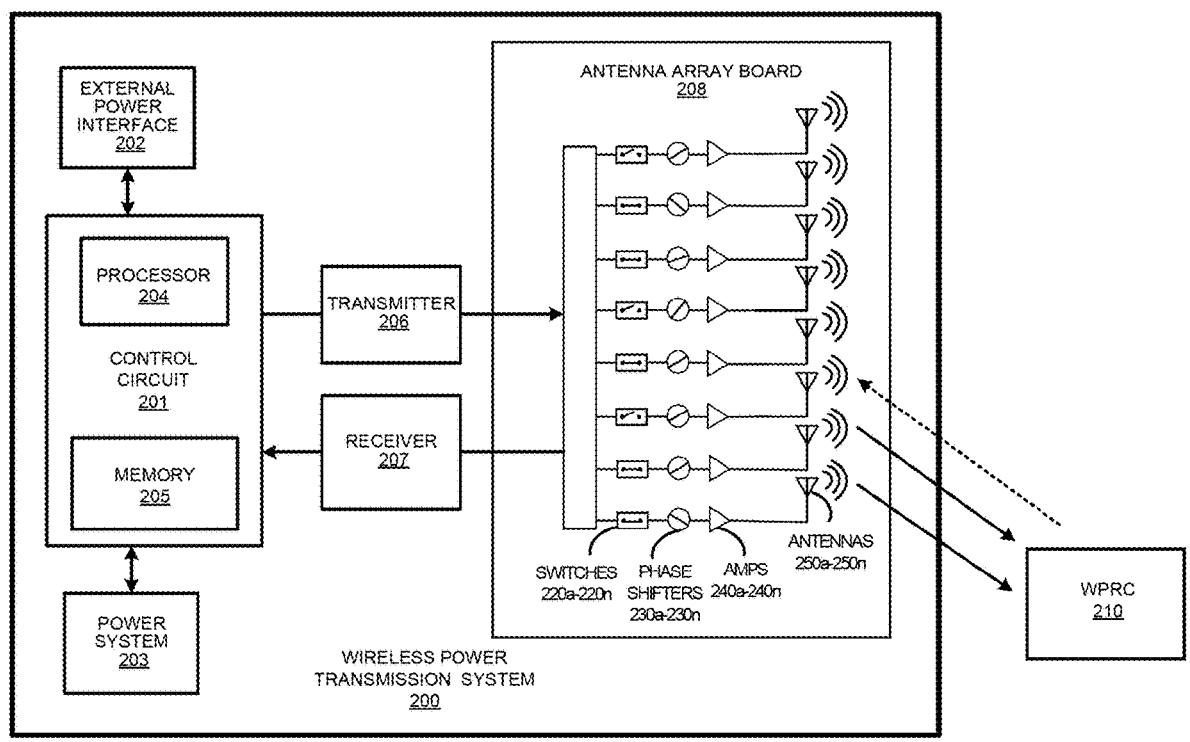
FIG. 2 is a block diagram illustrating example components of an example embodiment of a WPTS.

FIG. 2 is a block diagram illustrating example components of a WPTS 200 in accordance with the embodiments described herein. As illustrated in the example of FIG. 2, the WPTS 200 may include a control circuit 201, external power interface 202, and power system 203. Control circuit 201 may include processor 204, for example a base band processor, and memory 205. Additionally, although only one antenna array board 208 and one transmitter 206 are depicted in FIG. 2, WPTS 200 may include one or more transmitters 206 coupled to one or more antenna array boards 208 and transmit signals to the one or more antenna array boards 208. Although only one receiver is depicted in FIG. 2, one or more receivers 207 may be coupled to the one or more antenna array boards 208 and may receive signals from the one or more antennas 250a-250n of the one or more antenna array boards 208. Each antenna array board 208 includes switches 220a-220n, phase shifters 230a-230n, power amplifiers 240a-240n, and antenna arrays 250a-250n. Although each switch, phase shifter, power amplifier, and antenna is depicted in a one-to-one relationship, this should not be construed as limiting. Additionally or alternatively, any number of switches, phase shifters, power amplifiers, and antennas may be coupled. Some or all of the components of the WPTS 200 can be omitted, combined, or sub-divided in some embodiments. Furthermore, the setting of the switches 220a-220n and phase shifters 230a-230n should not be construed as limiting. Any of the switches 220a-220n, phase shifters 230a-230n, and/or power amplifiers 240a-240n, or any combination thereof, may be individually controlled or controlled in groups. The signals transmitted and received by the one or more antenna array boards 208 may be wireless power signals, wireless data signals, or both.

Control circuit 201 is configured to provide control and intelligence to the array components including the switches 220a-220n, phase shifters 230a-230n, power amplifiers 240a-240n, and antenna arrays 250a-250n. Control circuit 201 may direct and control the various data and power communications. Transmitter 206 can generate a signal comprising power or data communications on a carrier frequency. The signal can be comply with a standardized format such as Bluetooth™, Wi-Fi™, ZigBee™, etc., including combinations or variations thereof. Additionally or alternatively, the signal can be a proprietary format that does not use Bluetooth™, Wi-Fi™, ZigBee™, and the like, and utilizes the same switches 220a-220n, phase shifters 230a-230n, power amplifiers 240a-240n, and antenna arrays 250a-250n to transmit wireless data as are used to transmit wireless power. Such a configuration may save on hardware complexity and conserve power by operating independently of the constraints imposed by compliance with the aforementioned standardized formats. In some embodiments, control circuit 201 can also determine a transmission configuration comprising a directional transmission through the control of the switches 220a-220n, phase shifters 230a-230n, and amplifiers 240a-240n based on an encoded beacon signal received from a WPRC 210.

The external power interface 202 is configured to receive external power and provide the power to various components. In some embodiments, the external power interface 202 may be configured to receive, for example, a standard external 24 Volt power supply. In other embodiments, the external power interface 202 can be, for example, 120/240 Volt AC mains to an embedded DC power supply which may source, for example, 12/24/48 Volt DC to provide the power to various components. Alternatively, the external power interface could be a DC supply which may source, for example, 12/24/48 Volts DC. Alternative configurations including other voltages are also possible.

Switches 220a-220n may be activated to transmit power and/or data and receive encoded beacon signals based on the state of the switches 220a-220n. In one example, switches 220a-220n may be activated, e.g. closed, or deactivated, e.g. open, for power transmission, data transmission, and/or encoded beacon reception. Additional components are also possible. For example, in some embodiments phase-shifters 230a-230n may be included to change the phase of a signal when transmitting power or data to a WPRC 210. Phase shifter 230a-230n may transmit a power or data signal to WPRC 210 based on a phase of a complex conjugate of the encoded beaconing signal from WPRC 210. The phase-shift may also be determined by processing the encoded beaconing signal received from WPRC 210 and identifying WPRC 210. WPTS 200 may then determine a phase-shift associated with WPRC 210 to transmit the power signal. In an example embodiment, data transmitted from the WPTS 200 may be in the form of communication beacons which may be used to synchronize clocks with WPRC 210. This synchronization may improve the reliability of beacon phase detection.

In operation, control circuit 201, which may control the WPTS 200, may receive power from a power source over external power interface 202 and may be activated. Control circuit 201 may identify an available WPRC 210 within range of the WPTS 200 by receiving an encoded beacon signal initiated by the WPRC 210 via at least a portion of antennas 250a-250n. When the WPRC 210 is identified based on the encoded beacon signal, a set of antenna elements on the WPTS may power on, enumerate, and calibrate for wireless power and/or data transmission. At this point, control circuit 201 may also be able to simultaneously receive additional encoded beacon signals from other WPRCs via at least a portion of antennas 250a-250n.

Once the transmission configuration has been generated and instructions have been received from control circuit 201, transmitter 206 may generate and transfer one or more power and/or data signal waves to one or more antenna boards 208. Based on the instruction and generated signals, at least a portion of power switches 220a-220n may be opened or closed and at least a portion of phase shifters 230a-230n may be set to the appropriate phase associated with the transmission configuration. The power and/or data signal may then be amplified by at least a portion of power amplifiers 240a-240n and transmitted at an angle directed toward a location of WPRC 210. As discussed herein, at least a portion of antennas 250a-250n may be simultaneously receiving encoded beacon signals from additional WPRCs 210.

As described above, a WPTS 200 may include one or more antenna array boards 208. In one embodiment, each antenna array board 208 may be configured to communicate with a single WPRC 210, so that a different antenna array board 208 of a plurality of antenna array boards 208 communicates with a different WPRC 210 of a plurality of WPRCs 210. Such an implementation may remove a reliance on a communication method, such as a low-rate personal area network (LR-WPAN), IEEE 802.15.4, or Bluetooth Low Energy (BLE) connection to synchronize with a WPRC 210. A WPTS 200 may receive a same message from a WPRC 210 via different antennas of antennas 250a-250n. The WPTS 200 may use the replication of the same message across the different antennas to establish a more reliable communication link. In such a scenario, a beacon power may be lowered since the lower power can be compensated by the improved reliability owed to the replicated received signals. In some embodiments, it may also be possible to dedicate certain antennas or groups of antennas for data communication and dedicate other antennas or groups of antennas for power delivery. For example, an example WPTS 200 may dedicate 8 or 16 antennas of antennas 250a-250n to data communication at a lower power level than some number of remaining antennas that may be dedicated to power delivery at a relatively higher power level than the data communication.

Figure 3:
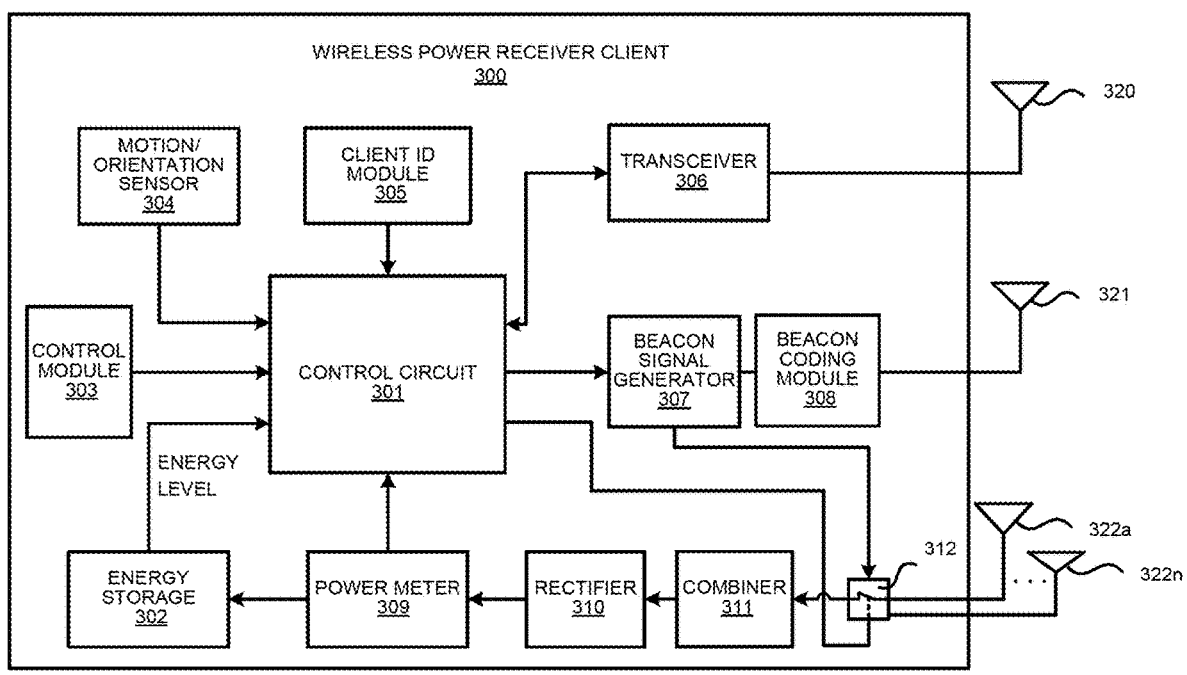
FIG. 3 is a block diagram illustrating an example embodiment of a WPRC.

FIG. 3 is a block diagram illustrating an example WPRC 300 in accordance with embodiments described herein. As shown in the example of FIG. 3, WPRC 300 may include control circuit 301, energy storage 302, a control module 303, for example an Internet of Things (IoT) control module, transceiver 306 and associated one or more antennas 320, power meter 309, rectifier 310, a combiner 311, beacon signal generator 307, beacon coding unit 308 and associated one or more antennas 321, and switch 312 connecting the combiner 311 or the beacon signal generator 307 to one or more associated antennas 322a-322n. The energy storage 302 may be, for example, a batter, a capacitor, or any other suitable energy storage device. Although not depicted, the WPRC 300 may include an energy harvesting circuit which may enable the WPRC 300 to operate with a capacitor for short term energy storage instead of or in addition to using a battery. Some or all of the depicted components in FIG. 3 can be omitted, combined, or sub-divided in some embodiments. Some or all of the components depicted in FIG. 3 may be incorporated in a single integrated chip (IC). It should be noted that although the WPTS 200 may use full-duplexing, WPRC 300 may additionally or alternatively use half-duplexing. A received and/or transmitted data rate may be, for example, 20 Mbps. However, higher or lower data rates may be implemented to achieve other design goals. The WPRC 300 may transmit acknowledgement (ACK) messages back to a WPTS, such as a WPTS 200 depicted in FIG. 2. Although not depicted, a local CPU may be incorporated into WPRC 300. For example, the local CPU may be included in the control circuit 301.

A combiner 311 may receive and combine the received power and/or data transmission signals received via one or more antennas 322a-322n. The combiner can be any combiner or divider circuit that is configured to achieve isolation between output ports while maintaining a matched condition. For example, the combiner 311 can be a Wilkinson Power Divider circuit. The combiner 311 may be used to combine two or more RF signals while maintaining a characteristic impedance, for example, 50 ohms. The combiner 311 may be a resistive-type combiner, which uses resistors, or a hybrid-type combiner, which uses transformers. The rectifier 310 may receive the combined power transmission signal from the combiner 311, if present, which may be fed through the power meter 309 to the energy storage 302 for charging. In other embodiments, each antenna's power path can have its own rectifier 310 and the DC power out of the rectifiers is combined prior to feeding the power meter 309. The power meter 309 may measure the received power signal strength and may provide the control circuit 301 with this measurement.

Energy storage 302 may include protection circuitry and/or monitoring functions. Additionally, the energy storage 302 may include one or more features, including, but not limited to, current limiting, temperature protection, over/under voltage alerts and protection, and capacity monitoring, for example coulomb monitoring. The control circuit 301 may receive the energy level from the energy storage 302 itself. The control circuit 301 may also transmit/receive via the transceiver 306 a data signal on a data carrier frequency, such as the base signal clock for clock synchronization. The beacon signal generator 307 may generate the beacon signal or calibration signal and may transmit the beacon signal or calibration signal using one or more antennas 321.

It may be noted that, although the energy storage 302 is shown as charged by, and providing power to, WPRC 300, the receiver may also receive its power directly from the rectifier 310. This may be in addition to the rectifier 310 providing charging current to the energy storage 302, or in lieu of providing charging. Also, it may be noted that the use of multiple antennas 320, 321, and 322a-322n is one example of implementation, however the structure may be reduced to fewer antennas, such as one shared antenna.

In some embodiments, the control circuit 301 and/or the control module 303 can communicate with and/or otherwise derive device information from WPRC 300. The device information can include, but is not limited to, information about the capabilities of the WPRC 300, usage information of the WPRC 300, power levels of the energy storage 302 of the WPRC 300, and/or information obtained or inferred by the WPRC 300. In some embodiments, a client identifier (ID) module 305 stores a client ID that can uniquely identify the WPRC 300 in a wireless power delivery environment. For example, the ID can be transmitted to one or more WPTSs in the encoded beacon signal. In some embodiments, WPRCs may also be able to receive and identify other WPRCs in a wireless power delivery environment based on the client ID.

A motion/orientation sensor 304 can detect motion and/or orientation and may signal the control circuit 301 to act accordingly. For example, a device receiving power may integrate motion detection mechanisms such as accelerometers or equivalent mechanisms to detect motion. Once the device detects that it is in motion, it may be assumed that it is being handled by a user, and may trigger a signal to the antenna array of the WPTS to either stop transmitting power and/or data, or to initiate wireless power and/or data transmission from the WPTS. The WPRC may use the encoded beacon or other signaling to communicate with the WPTS. In some embodiments, when a WPRC 300 is used in a moving environment like a car, train or plane, the power might only be transmitted intermittently or at a reduced level unless the WPRC 300 is critically low on power.

Additionally or alternatively, a WPRC 300 may include an orientation sensor which may sense a particular orientation of the WPRC 300. An orientation of the WPRC 300 may affect how it receives wireless power from a WPTS. Thus, an orientation may be used to determine a best WPTS with which to pair. Motion/orientation sensor 304 may include only a motion sensor, only an orientation sensor, or may integrate both. Alternatively, two or more separate sensors may be used. Additionally or alternatively, a WPRC 300 may detect a direction of signals received via its antennas from one or more WPTSs to determine its orientation relative to the one or more WPTSs. Thus, in some embodiments, a WPRC 300 may be able to detect a relative orientation without a need for an orientation sensor.

Figure 4:
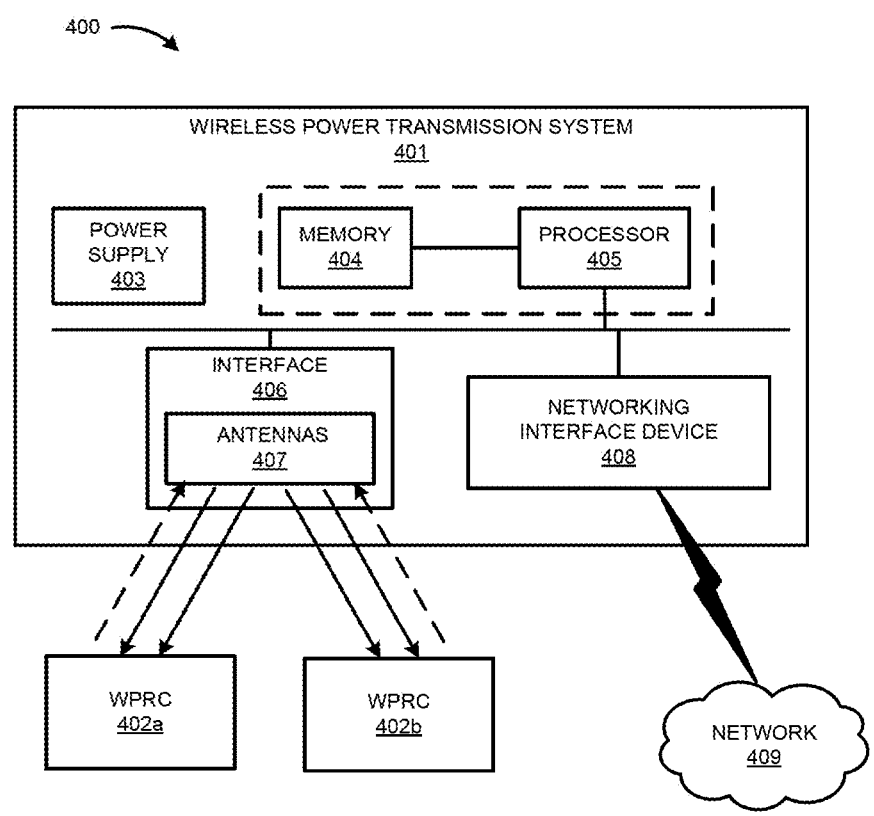
FIG. 4 is a diagram illustrating an example embodiment of a wireless signal delivery environment.

FIG. 4 is a diagram illustrating an example wireless signal delivery environment 400 in accordance with embodiments described herein. The wireless signal delivery environment 400 includes WPTS 401, a user operating WPRCs 402a and 402b, and wireless network 409. Although two WPRCs are depicted in FIG. 4, any number of WPRCs may be supported. WPTS 401 as depicted in FIG. 4 can alternatively be implemented in accordance with WPTS 101 as depicted in FIG. 1. Alternative configurations are also possible. Likewise, WPRCs 402a and 402b as depicted in FIG. 4 can be implemented in accordance with WPRCs 110a-110c of FIG. 1, or can be implemented in accordance with WPRC 300 as depicted in FIG. 3, although alternative configurations are also possible.

WPTS 401 may include a power supply 403, memory 404, processor 405, interface 406, one or more antennas 407, and a networking interface device 408. Some or all of the components of the WPTS 401 can be omitted, combined, or sub-divided in some embodiments. The networking interface device may communicate wired or wirelessly with a network 409 to exchange information that may ultimately be communicated to or from WPRCs 402a and 402b. The one or more antennas 407 may also include one or more receivers, transmitters, and/or transceivers. The one or more antennas 407 may have a radiation and reception pattern directed in a space proximate to WPRC 402a, WPRC 402b, or both, as appropriate. WPTS 401 may transmit a wireless power signal, wireless data signal, or both over at least a portion of antennas 407 to WPRCs 402a and 402b. As discussed herein, WPTS 401 may transmit the wireless power signal, wireless data signal, or both at an angle in the direction of WPRCs 402a and 402b such that the strength of the respectively received wireless signal by WPRCs 402a and 402b depends on the accuracy of the directivity of the corresponding directed transmission beams from at least a portion of antennas 407.

A fundamental property of antennas is that the receiving pattern of an antenna when used for receiving is directly related to the far-field radiation pattern of the antenna when used for transmitting. This is a consequence of the reciprocity theorem in electromagnetics. The radiation pattern can be any number of shapes and strengths depending on the directivity of the beam created by the waveform characteristics and the types of antennas used in the antenna design of the antennas 407. The types of antennas 407 may include, for example, horn antennas, simple vertical antenna, etc. The antenna radiation pattern can comprise any number of different antenna radiation patterns, including various directive patterns, in a wireless signal delivery environment 400. By way of example and not limitation, wireless power transmit characteristics can include phase settings for each antenna and/or transceiver, transmission power settings for each antenna and/or transceiver, or any combination of groups of antennas and transceivers, etc.

As described herein, the WPTS 401 may determine wireless communication transmit characteristics such that, once the antennas and/or transceivers are configured, the multiple antennas and/or transceivers are operable to transmit a wireless power signal and/or wireless data signal that matches the WPRC radiation pattern in the space proximate to the WPRC. Advantageously, as discussed herein, the wireless signal, including a power signal, data signal, or both, may be adjusted to more accurately direct the beam of the wireless signal toward a location of a respective WPRC, such as WPRCs 402a and 402b as depicted in FIG. 4.

The directivity of the radiation pattern shown in the example of FIG. 4 is illustrated for simplicity. It is appreciated that any number of paths can be utilized for transmitting the wireless signal to WPRCs 402a and 402b depending on, among other factors, reflective and absorptive objects in the wireless communication delivery environment. FIG. 4 depicts direct signal paths, however other signal paths, including multi-path signals, that are not direct are also possible.

The positioning and repositioning of WPRCs 402a and 402b in the wireless communication delivery environment may be tracked by WPTS 401 using a three-dimensional angle of incidence of an RF signal at any polarity paired with a distance that may be determined by using an RF signal strength or any other method. As discussed herein, an array of antennas 407 capable of measuring phase may be used to detect a wave-front angle of incidence. A respective angle of direction toward WPRCs 402a and 402b may be determined based on respective distance to WPRCs 402a and 402b and on respective power calculations. Alternatively, or additionally, the respective angle of direction to WPRCs 402a and 402b can be determined from multiple antenna array segments 407.

In some embodiments, the degree of accuracy in determining the respective angle of direction toward WPRCs 402a and 402b may depend on the size and number of antennas 407, number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Figure 5:
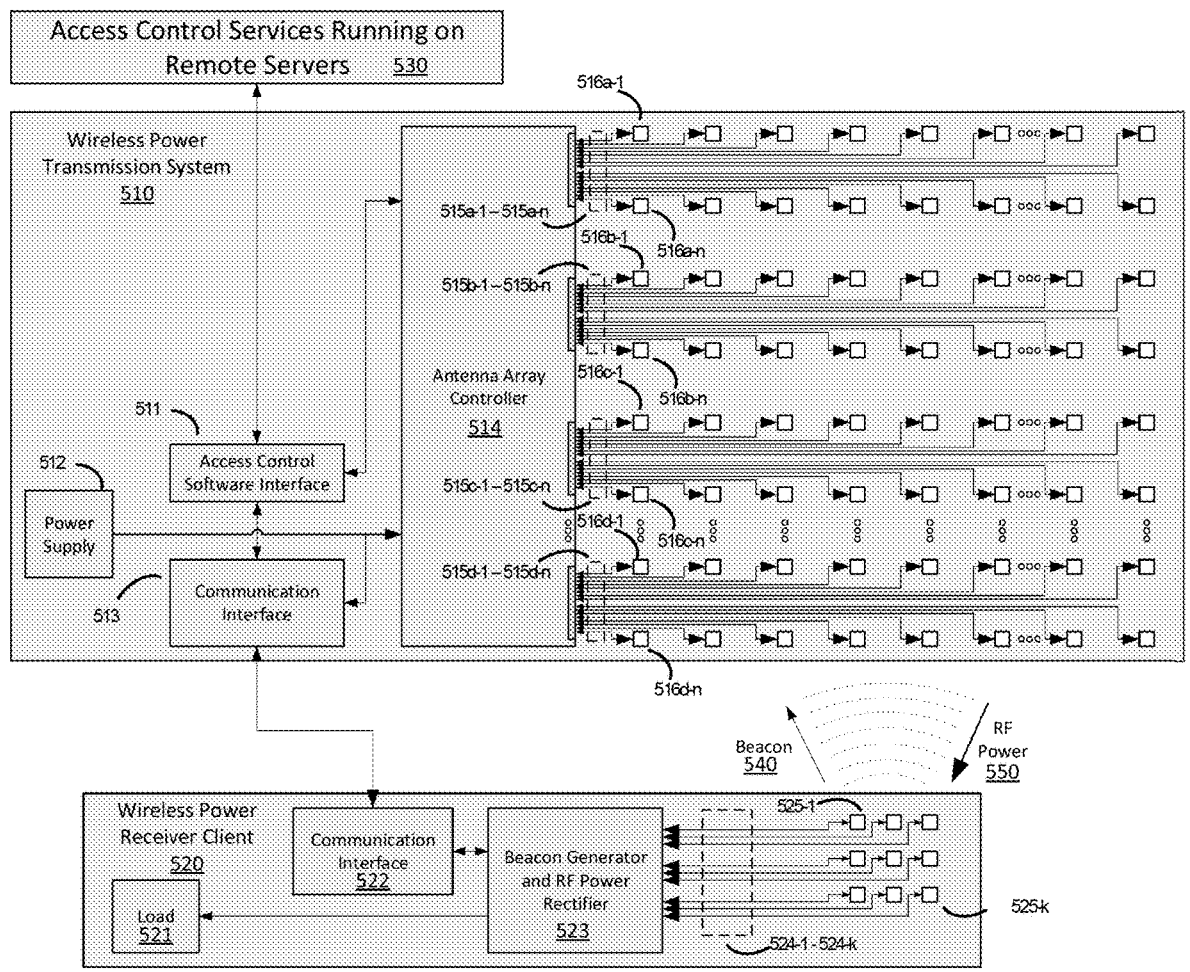
FIG. 5 is a diagram of an example embodiment of a wireless power delivery system based on a point-to-point architecture.

FIG. 5 depicts an example embodiment of a wireless power delivery system 500. The wireless power delivery system 500 may include one or more WPTSs such as WPTS 510, one or more WPRCs such as WPRC 520, and may also include access control services 530 that may run on one or more remote servers. Access control services 530 may be used to determine whether a WPRC, such as WPRC 520, is authorized to receive wireless power from the WPTS 510. In this way, for example, power may be delivered to only registered devices, to users who subscribe to a service, etc. In one embodiment, the WPTS 510 may transmit wireless power via a 2.4 GHz signal. In one embodiment, the access control services 530 may be running on one or more remote servers.

The WPRC 520 as depicted in FIG. 5 may include a communication interface 522. The communication interface 522 may be wired or wireless and may be used to communicate with WPTS 510. WPRC 520 may further include a beacon generator and radio frequency (RF) power rectifier 523. The beacon generator and RF power rectifier 523 may be coupled to the communication interface 522. The beacon generator and RF power rectifier 523 may also be coupled through connections 524-1-524-k to antennas 525-1-525-k, respectively. Although not depicted, the communication interface 522 may be additionally or alternatively coupled to antennas 525-1-525-k through connections 524-1-524-k or via other connections not depicted. Although nine antennas and corresponding connections are depicted in FIG. 5, any number of antennas may be used. As such, k may be any reasonable integer number. The WPRC 520 may transmit one or more beacons 540 via any portion of the antennas 525-1-525-k and may receive RF power from the WPTS 510 via any portion of the antennas 525-1-525-k. Although not depicted, the WPRC 520 may communicate wirelessly with the WPTS 510 using any portion of the antennas 525-1-525-k via the communication interface 522. The WPRC 520 may include load 521, which may receive power sourced by RF power 550. Load 521 may additionally or alternatively be coupled to WPRC 520.

The WPTS 510 may include an access control software interface 511 that may be coupled to access control services 530, a power supply 512, a communication interface 513 that may be coupled to access control software interface 511 and to an antenna array controller 514, and connections 515a-1-515a-n, 515b-1-515b-n, 515c-1-515c-n, and 515d-1-515d-n coupling the antenna array controller 514 to antennas 516a-1-516a-n, 516b-1-5156-n, 516c-1-516c-n, and 516d-1-516d-n. The access controller software interface 511 may be responsible for managing power delivery scheduling and authentication. In one example, when a WPRC, such as WPRC 520, is detected and identified, access controller software interface 511 may verify that WPRC 520 is authorized to receive power. Access controller software interface 511 may verify this by checking an identity of WPRC 520 against an internal list or a list stored in an external server, such as access control services running on remote servers 530. The antenna array controller 514 may interface between power delivery management such as that provided by access control software interface 511, and antenna controllers. In one example, a separate antenna controller may be included with each antenna of antennas 516a-1-516a-n, 516b-1-5156-n, 516c-1-516c-n, and 516d-1-516d-n. The antenna array controller 514 may manage antenna controllers to set transmit/receive modes, synchronize events for power delivery across the array of antennas, collect and/or process phase beacon payload data, etc. Although a particular number of antennas are depicted in WPTS 510, any number of a plurality of antennas may be used. Similarly, the antennas are depicted in four groups, but any number of groups may be used. Antenna array controller 514 may interface with any portion of antennas 516a-1-516a-n, 516b-1-5156-n, 516c-1-516c-n, and 516d-1-516d-n via any portion of corresponding connections 515a-1-515a-n, 515b-1-515b-n, 515c-1-515c-n, 515d-1-515d-n to receive one or more beacons 540 from WPRC 520 and may transmit RF power 550 to WPRC 520. Although not depicted, the communication interface 513 may be additionally or alternatively coupled to any portion of antennas 516a-1-516a-n, 516b-1-5156-n, 516c-1-516c-n, and 516d-1-516d-n through connections 515a-1-515a-n, 515b-1-515b-n, 515c-1-515c-n, 515d-1-515d-n or via other connections not depicted.

In the design depicted in FIG. 5, a point-to-point architecture may be employed to couple the antennas to the antenna array controller 514. As such, as the number of antennas increases, the number of connections between the antennas and the antenna array controller 514 increases. In some embodiments, increasing a frequency of the wireless power signal from, for example, 2.4 GHz to 24 GHz may require additional antennas.

For a given aperture size for the WPTS and WPRC, delivery of power scales by the square of the frequency of the wireless power signal at a given distance. For example, power received at the WPRC, $P_r$ is as follows:

$$P_r = P_t G_t G_r \left(\frac{\lambda}{4\pi R}\right)^2, \text{ where} \quad (1)$$

$$G_t = 4\pi\varepsilon_t \left(\frac{A_t}{\lambda^2}\right)^2, \quad (2)$$

$$G_r = 4\pi\varepsilon_r \left(\frac{A_r}{\lambda^2}\right)^2, \quad (3)$$

for a transmitted power of $P_t$, a WPTS with an area of $A_t$, a WPRC with an area of $A_r$ that is separated from the WPTS by a distance R, a wavelength of the wireless power signal $\lambda$, an aperture efficiency for the WPTS of $\varepsilon_t$, and an aperture efficiency of the WPRC of $\varepsilon_r$. Thus, the ratio of the received power at the WPRC to the power transmitted by the WPTS is as follows:

$$\frac{P_r}{P_t} = \varepsilon_t A_t \varepsilon_r A_r \frac{1}{R^2} \frac{1}{\lambda^2}, \quad (4)$$

which is proportional to the square of the frequency of the transmitted power. Therefore, by increasing the frequency of the power transmitted by the WPTS, for example from 2.4 GHz to 5 GHz or 24 GHz, the power received at the WPRC may be increased.

Figure 6:
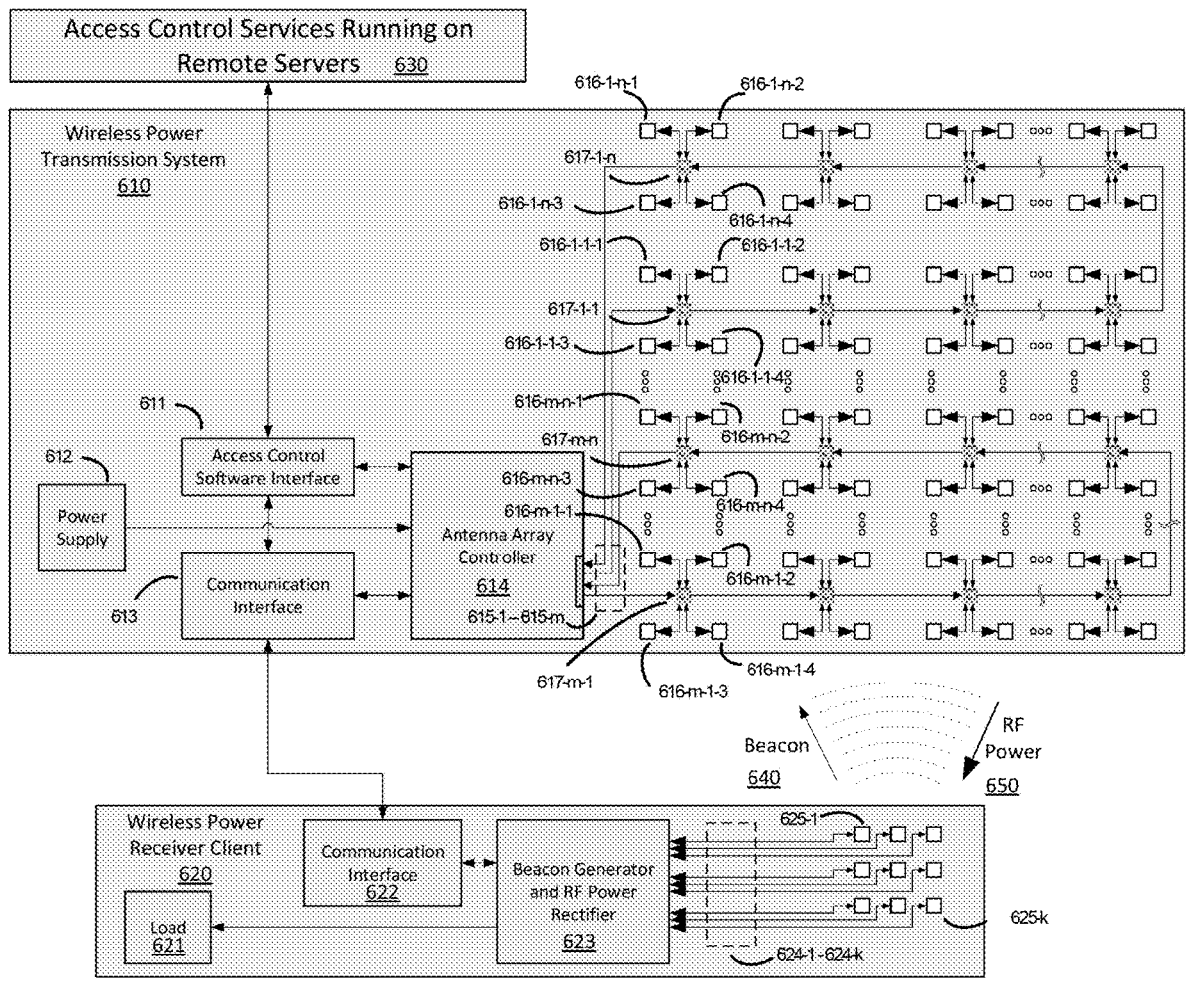
FIG. 6 is a diagram of another example embodiment of a wireless power delivery system based on a daisy chain architecture.

FIG. 6 depicts another example embodiment of a wireless power delivery system 600. The wireless power delivery system 600 may include one or more WPTSs such as WPTS 610, one or more WPRCs such as WPRC 620, and may also include access control services 630 that may run on one or more remote servers, such as described above with respect to access control services 530 depicted in FIG. 5. In one embodiment, the WPTS 610 may transmit wireless power via a 24 GHz signal. In one embodiment, the access control services 630 may be running on one or more remote servers.

WPRC 620 depicted in FIG. 6 may be similar to the WPRC 520 depicted in FIG. 5 and may include similar components and operate similarly as described above.

WPTS 610 depicted in FIG. 6 may include access control software interface 611, power supply 612, and communication interface 613 which may operate similarly as described for access control software interface 511, power supply 512, and communication interface 513 as depicted in FIG. 5.

WPTS 610 may also include an antenna array controller 614 that may use daisy-chain buses 615-1-615-m to communicate with antenna controllers 617-1-1-617-1-n and antenna controllers 617-m-1-617-m-n. Although only two daisy chain buses are depicted in FIG. 6, any number of daisy-chain buses may be used. Each antenna controller 617 may be coupled to any plurality of antennas 616. For example, as depicted in FIG. 6, each antenna controller 617 may be coupled to four antennas 616. Furthermore, although eight antenna controller 617 are depicted connected to each daisy chain bus 615, any number of antenna controllers 617 may be connected.

The antenna controllers 617 may be placed relatively close to the respective antennas 616 coupled to it. Antenna controllers 617, which will be explained in more detail below, may be small, simple circuits that may require minimal control and synchronization from antenna array controller 614 via a daisy-chain bus 615. A configuration such as that depicted in FIG. 6 may allow for a WPTS to have thousands of antennas without significant increases to cost. For example, a 30 cm×30 cm WPTS may be produced with 4,608 antennas may be manufactured without significant cost.

Figure 7:
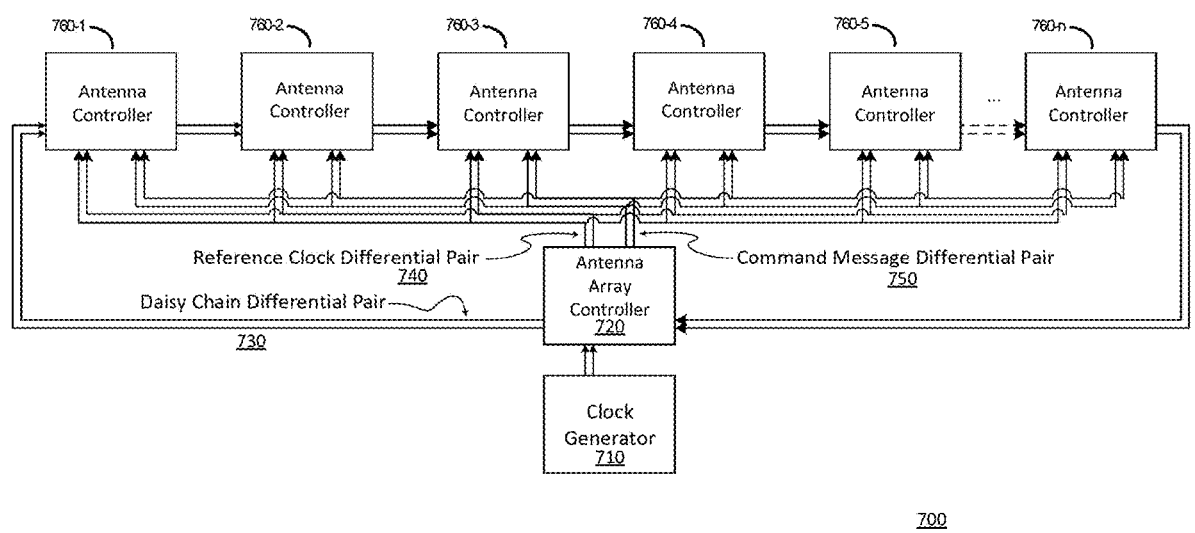
FIG. 7 is a diagram depicting a system including a plurality of antenna controllers, an antenna array controller, and a clock generator.

FIG. 7 is a diagram of an antenna array controller 720 coupled to a plurality of antenna controllers 760-1-760-n and a clock generator 710 such as may be used in WPTS 610 depicted in FIG. 6. Antenna array controller 720 may provide a reference clock to each of the antenna controllers 760-1-760-n via a reference clock differential pair 740. Antenna array controller 720 may also supply command messages via command message differential pair 750. As will be further detailed below, antenna array controller 720 may control antenna controllers 760-1-760-n via a daisy-chain differential pair 730. Although six antenna controllers 760-1-760-n are depicted, any number of antenna controllers 760 may be used.

The command message differential pair 750 may transmit a 1-bit single-ended control signal synchronous with the undivided reference clock and may be used to synchronize the phase locked loops (PLLs) of multiple antenna controllers. The PLL/voltage controlled oscillator (VCO) 810 of an antenna controller depicted in FIG. 8 will be described in greater detail below. Command messages sent via the command message differential pair 750 may be clocked by a version of the reference clock generated by clock generator 710 that is divided down by an integer. A message bit rate between, for example, 40-50 MBits/sec may be supported by dividing the reference clock by an appropriate integer. Each antenna controller 760-1-760-n may be individually configured to use either the positive edge or the negative edge of the reference clock.

Most high-level state information may be managed by antenna array controller 720. The antenna array controller 720 may send messages to the antenna controllers 760-1-760-n that may cause one or more state machines within the antenna controllers 760-1-760-n to automatically sequence through a series of states. Some of these messages may include, for example, a "create a first phase beacon slot" message.

Command messages may be variable length and may be broadcast by the antenna array controller 720 via the command message differential pair 750 to the individual antenna controllers 760-1-760-n using a single command message signal that may be synchronized with the reference clock transmitted via the reference clock differential pair 740. By synchronizing command message to the reference clock, a separate clock line may be avoided to clock the commands and it allows commands to be used to ensure that all antenna controllers 760-1-760-n are phase-synchronized with each other. Although not depicted, the reference clock differential pair 740 and command message differential pair 750 may be propagation-delay matched. The data rate on the command message differential pair 750 may be configurable to be, for example, ½, ¼, ⅙, or ⅛ the rate of the reference clock. Other rates may be possible.

One or more messages may be passed from the antenna controllers 760-1-760-n to the antenna array controller 720 via the daisy chain differential pair 730. A single signal may start at the antenna array controller 720 and may pass through a delay chain of a plurality of stages per each antenna controller 760, and return to the antenna array controller 720. Each antenna controller 760 may include, for example, approximately 22 stages introducing delays. The daisy chain differential pair 730 may be synchronous with the reference clock. A data rate on the daisy chain differential pair 730 may be configurable to be, for example, ½, ¼, ⅙, or ⅛ the rate of the reference clock. Other rates may be possible.

To initialize a WPTS sequence order, the antenna array controller 720 may send a sequencing message via the daisy chain differential pair 730 to the first antenna controller 760-1. Antenna controller 760-1 may set its index to an index included in the sequencing message. The antenna controller 760-1 may increment the index included in the sequencing message and then forward the sequencing message to the next antenna controller 760-2. Antenna controller 760-2 may set its index to the index in the sequencing message it received, which was incremented by antenna controller 760-1. Antenna controller 760-2 may increment the index included in the sequencing message again and the forward the sequencing message onward. This process repeats until the sequencing message has returned to the antenna array controller 720. In this way, all of the antenna controllers 760-1-760-$n$ may be enumerated with an index and the antenna array controller may determine how many antenna controllers 760 are in the daisy chain based on the value of the index returned.

Although FIG. 7 depicts differential pairs and the description above refers to these differential pairs, command message differential pair 750, reference clock differential pair 740, and daisy chain differential pair 730 need not be differential pairs, but may be any form of bus that transmits any suitable signals across the bus.

Figure 8:
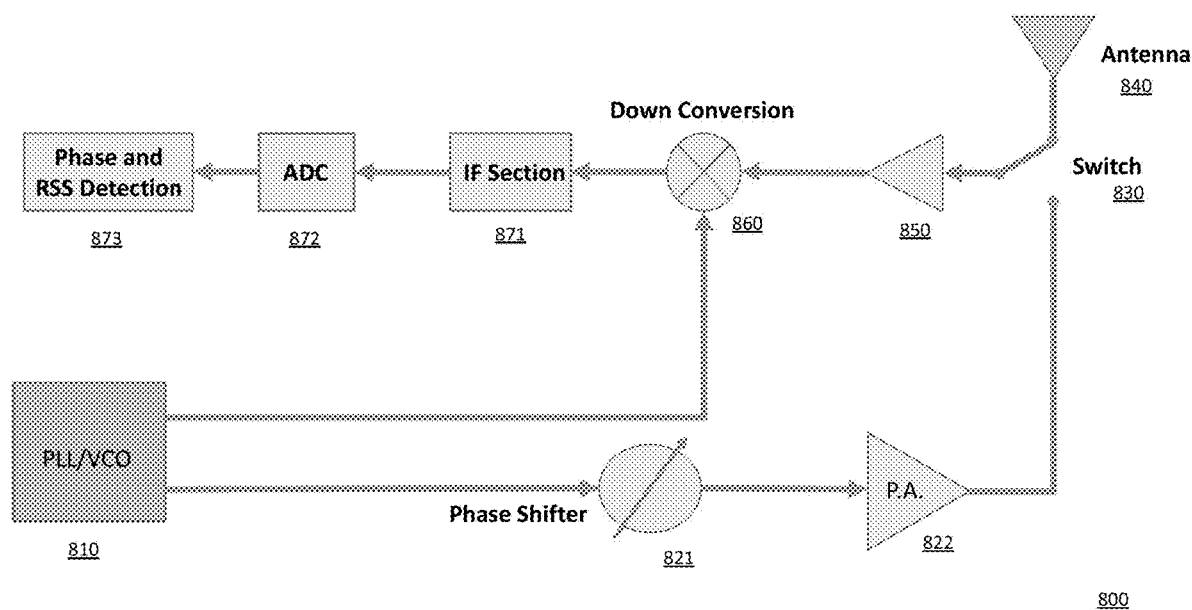
FIG. 8 is a diagram of an antenna management unit.

FIG. 8 is a diagram of an antenna management unit (AMU) 800. In a configuration such as that depicted in FIG. 6 wherein an antenna controller 617 is coupled to four antennas 616, the antenna controller 617 may include four AMUs 800. In this scenario, the antenna controller 617 may include a single PLL/VCO 810 that may be shared across the four AMUs 800. In some embodiments, as frequencies increase, it may be desirable to have more AMUs 800 per antenna controller 617 to drive correspondingly more antennas 616. The PLL/VCO 810 may be coupled to a phase shifter 821 and a mixer 860.

In a receive mode, the switch 830 may be set to couple the antenna 840 to low noise amplifier (LNA) 850. A beacon signal received from a WPRC may be received at the antenna 840, amplified by the LNA 850, and down-converted to an intermediate frequency (IF) by the mixer 860. The down-converted signal may then be passed through an IF section 871 for filtering and/or signal conditioning and output to an analog-to-digital converter (ADC) 872 where it may be digitized for beacon phase and/or received signal strength (RSS) detection 873.

In a transmit mode, the switch 830 may be set to couple power amplifier 822 to antenna 840. A signal from the PLL/VCO 810 may be driven to the antenna 840 by the power amplifier 822 through the phase shifter 821 to deliver wireless power and/or data to a WPRC. The phase shifter 821 may be programmed to the complex conjugate of a received phase beacon signal. AMU 800 may be used in conjunction with one or more additional AMUs 800 respectively driving one or more additional antennas 840 to directionally focus wireless power and/or data to one or more WPRCs.

Figure 9:
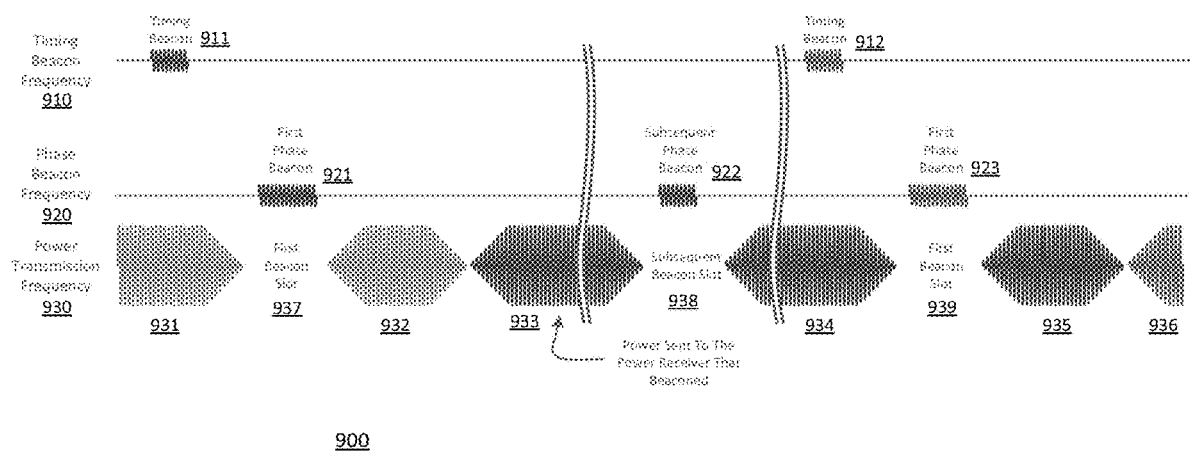
FIG. 9 is a timing diagram depicting timing beacons, phase beacons, and wireless power transmissions.

FIG. 9 is a timing diagram that depicts a frequency domain duplexing (FDD) and time domain duplexing (TDD) exchange of timing beacons, phase beacons, and wireless power transmission. While a WPTS may be transmitting wireless power, such as wireless power transmission 931, using a particular power transmission frequency 930, a first WPRC may transmit a timing beacon 911 using another frequency 910 that is offset from the power transmission frequency 930. The frequency 910 used for transmission of the timing beacon 911 may be offset from the power transmission frequency 930 to avoid self-jamming by the wireless power transmission 931 and to enable asynchronous detection of timing beacon 911 while the wireless power transmission 931 is being transmitted. Using a timing beacon that is transmitted at a frequency that is offset from a power transmission frequency also enables the use of multiple power transmitters. The timing beacon 911 may be encoded so that the WPTS may determine if the WPRC that transmitted the timing beacon 911 is registered to that WPTS. Basing signal and power exchange on a timing beacon that is transmitted by the WPRC rather than basing signal and power exchange on a schedule controlled by the WPTS, the WPRC may be able to stay in a deep sleep until the WPRC has an actual need for power. This may reduce overhead associated with frequent communications that were present in conventional systems that employed a schedule controlled by the WPTS.

Once the timing beacon 911 has been detected by the WPTS, the WPTS may stop transmitting wireless power during the first beacon slot 937 and wait for the first phase beacon 921 received via phase beacon frequency 920. Phase beacon frequency 920 may be the same as power transmission frequency 930 or may be different. The WPTS may use the first phase beacon 921 for actual phase detection. Using the detected phase, the WPTS may directionally focus wireless power transmission 933 at a location of the WPRC. First phase beacon 921 may also be encoded to convey data to the WPTS such as the ID of the WPRC, state of charge of the WPRC, etc. One or more subsequent phase beacons 922 may be transmitted and the WPTS may halt power transmission during one or more subsequent beacon slots 938 based on the timing established by the timing beacon 911. The one or more subsequent beacon slots 938 may additionally or alternatively be scheduled via communication between the WPTS and the WPRC. The subsequent phase beacon 922 may be used to detect phase and directionally focus wireless power transmission 934 at a location of the WPRC, which may now be a new location due to the WPRC having moved or due to changes in the environment. A timing beacon 912 from the same WPRC or from a new WPRC may be transmitted using the timing beacon frequency 910, followed by a phase beacon 923 using the phase beacon frequency 920, and the WPTS may receive the phase beacon 923 during the associated phase beacon slot 939 and use the phase beacon 923 to directionally focus wireless power transmission 936 at a location corresponding to the phase beacon 923.

While power delivery may be initiated by the WPRC through the timing beacon, in some embodiments, the WPTS may have some control over beacon scheduling through communication with the WPRC to set intervals between subsequent beacons. If large changes in the phase pattern from a WPRC's phase beacon are detected, the WPTS can infer that this receiver is likely moving. The WPTS can subsequently request more frequent phase beacons and send shorter power slots between phase beacons for more accurate tracking of the WPRC. Conversely, if phase patterns for a phase beacon are relatively static, the WPTS can infer that this WPRC is more or less stationary and may reduce the number of phase beacons and may increase a power slot duration of a wireless power transmission. In this way, the efficiency of power delivery to static WPRCs may be increased by reducing beacon overhead, while safe power delivery may be maintained for WPRCs which may be moving more rapidly.

In some embodiments, an output power of a timing beacon or a phase beacon may be adjusted based on the distance of the WPRC from the WPTS. For example, in one embodiment, a WPRC at a closer distance could reduce the output power of its beacon to consume less energy while staying within the dynamic range of the WPTS. This could be accomplished through feedback from the WPTS, which may infer the distance based on the average magnitude of the last beacon signal, or by the WPRC itself based on the magnitude of the power delivered in the last cycle. A variable beacon power enables conservation of WPRC power and reduces dynamic range requires of the WPTS.

In some embodiments, by scavenging ambient RF energy, WPRCs with a fully discharged battery are able to accumulate enough energy to send a beacon and initiate power transfer from the WPTS. This enables a WPRC to not require direct/wired charging. In some embodiments, by reaching a deeper depth of energy discharge, a WPRC equipped with certain battery types may be operate with a longer lifetime. A WPRC capable of such harvesting of ambient RF energy may use a super capacitor for primary energy storage instead of a battery.

In some embodiments, a WPTS may also adjust the power level of its wireless power transmissions. By sensing a received signal strength indicator (RSSI) of a beacon signal across an antenna array of the WPTS, the WPTS can infer a distance between the WPTS and the WPRC. Combining this information with knowledge of the power requirements of the WPRC and the expected link budget, the WPTS can increase or decrease its output power to regulate the amount of power received by the WPRC. This avoids potentially exposing WPRCs that are close to the WPTS to excessive amounts of energy that could damage the rectifier or unnecessarily interfere with data communications.

Figure 10:
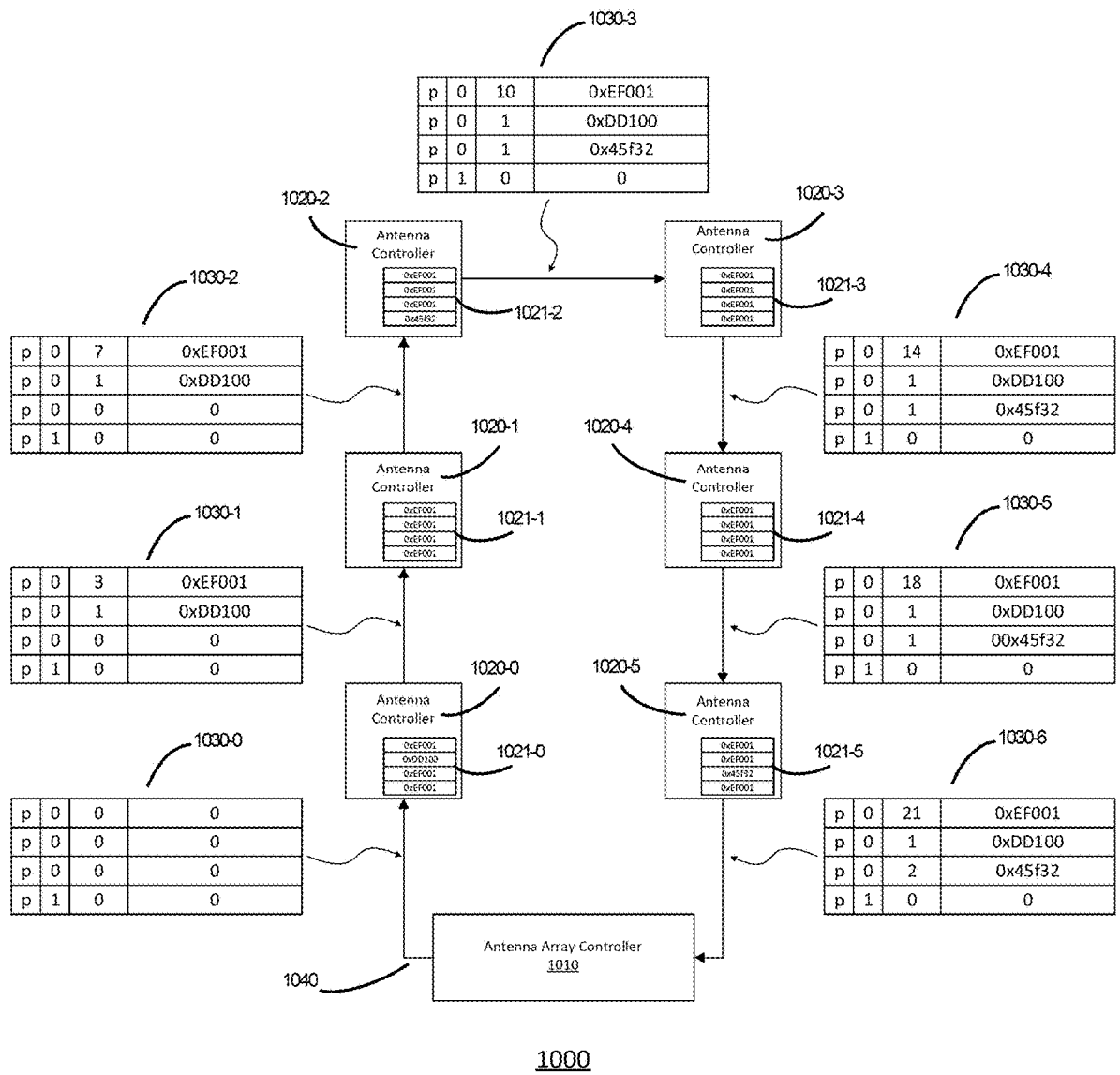
FIG. 10 is a diagram depicting the propagation of a payload list around a daisy-chained arrangement of antenna controllers and an antenna array controller.

FIG. 10 depicts an example of how a WPRC payload list may propagate around a daisy chained arrangement 1000 of antenna controllers 1020-0-1020-5 and an antenna array controller 1010. A payload list may indicate information encoded in a phase beacon, such as a WPRC ID, state of charge, wireless sensor data, a quantity of received RF power in a previous cycle, or other information depending on the application. In one example, after a phase beacon slot, such as first beacon slot 937 depicted in FIG. 9, the antenna array controller 1010 may determine which WPRC transmitted the phase beacon and may also determine how many antennas received the phase beacon. This information may be collected by creating a list of received WPRC IDs and an associated count in a payload list. This payload list may be forwarded on the daisy chain 1040 to a next antenna controller 1020 or back to the antenna array controller 1010.

In one example, a first antenna controller, such as antenna controller 1020-0, may start the payload list propagation by creating an empty list 1030-0. Antenna controller 1020-0 may, for example, have a chip ID of zero. In another example, the antenna array controller 1010 may start the payload list propagation by passing an empty list 1030-0 to the first antenna controller 1020-0 such as depicted in FIG. 10. In the example payload list 1030-0-1030-6 depicted in FIG. 10, a first column may include a "p" as an indication of a payload entry. In the example, a second column may include a "1" corresponding to the final payload entry in the list to indicate an end of the list. In the example, a third column may include a count reflecting how many antennas at which a corresponding payload was received. In the example, a fourth column may indicate unique values of the payloads received. The list may be passed from one antenna controller to the next antenna controller and edited by each antenna controller to update the list to reflect the received payload data by each antenna controller, such as received WPRC IDs, along the way. The list may, for example, reflect a WPRC ID and a corresponding count reflecting how many antennas on which the WPRC ID was received. Each of antenna controllers 1020-0-1020-5 may increment the corresponding counts of the WPRC IDs received at each of its antennas. Thus, in the example depicted in FIG. 10, the respective received payload information 1021-0-1021-5 for antenna controllers 1020-0-1020-5 each reflects four entries, each entry corresponding to a WPRC ID received at one of four antennas coupled to each antenna controller, such as shown in the WPTS 610 depicted in FIG. 6.

As depicted in FIG. 10, antenna controller 1020-0 may receive WPRC ID 0xEF001 at three antennas and WPRC ID 0xDD100 at one antenna. Thus, antenna controller 1020-0 may update the payload list 1030-1 to add two entries to indicate a count of three for 0xEF001 and a count of one for 0xDD100. Antenna controller 1020-1 may receive WPRC ID 0xEF001 at all four of its antennas. Thus, antenna controller 1020-1 increment the count for 0xEF001 by four and update the payload list 1030-2 to indicate a count of seven for 0xEF001 and a count of one for 0xDD100. Antenna controller 1020-2 may receive WPRC ID 0xEF001 at three of its antennas and WPRC ID 0x45f32 at one of its antennas. Thus, antenna controller 1020-2 may increment the count for 0xEF001 by three and add WPRC ID 0x45f32 to the payload list. The updated payload list 1030-3 may now indicate a count of ten for 0xEF001, a count of one for 0xDD100, and a count of one for 0x45f32. Antenna controller 1020-3 may receive WPRC ID 0xEF001 at all four of its antennas. Thus, antenna controller 1020-3 may increment the count for 0xEF001 by four and update the payload list 1030-4 to indicate a count of fourteen for 0xEF001, a count of one for 0xDD100 and a count of one for 0x45f32. Antenna controller 1020-4 may also receive WPRC ID 0xEF001 at all four of its antennas. Thus, antenna controller 1020-4 may increment the count for 0xEF001 by four and update the payload list 1030-5 to indicate a count of eighteen for 0xEF001, a count of one for 0xDD100 and a count of one for 0x45f32. Antenna controller 1020-5 may receive WPRC ID 0xEF001 at three of its antennas and WPRC ID 0x45f32 at one of its antennas. Thus, antenna controller 1020-5 may increment the count for 0xEF001 by three and increment the count for WPRC ID 0x45f32 by one. The updated payload list 1030-6 may now indicate a count of twenty-one for 0xEF001, a count of one for 0xDD100, and a count of two for 0x45f32. Payload list 1030-6 may then be returned to the antenna array controller 1010 where it is able to determine what WPRC IDs were received and associated counts.

Typically, the payload list 1030-6 should only contain a single entry with a count equal to the number of antennas, such as twenty-four in the example depicted in FIG. 10, indicating that the same entry was received by all antennas from the WPRC expected to beacon. More than one entry, such as that depicted in FIG. 10, may indicate a beacon collision or another type of failure during phase beacon reception. It should be noted that the payload received and the payload lists depicted in FIG. 10 are examples only and are not limiting in any way.

In one example, each of antenna controllers 1020-0-1020-5 may include four AMUs, such as AMU 800 depicted in FIG. 8. In some embodiments, if any of the AMUs were unable to parse the WPRC payload out of the phase beacon, then they may add a special reserved WPRC value to the payload list which represents that no WPRC payload was received.

In another example, a payload list may not be allowed to contain duplicate WPRC payload entries. Instead, the associated count for the entry already in the payload list will be incremented appropriately, such as described in the examples above and as depicted in FIG. 10. In one example, a last received WPRC payload message in the payload list may be flagged with a "last flag" to indicate the end of the payload list. As described above, in the example depicted in FIG. 10, the "last flag" for the last entry in the payload list 1030-0-1030-6 may be indicated by a single bit set to "1" in the second column.

Figure 11:
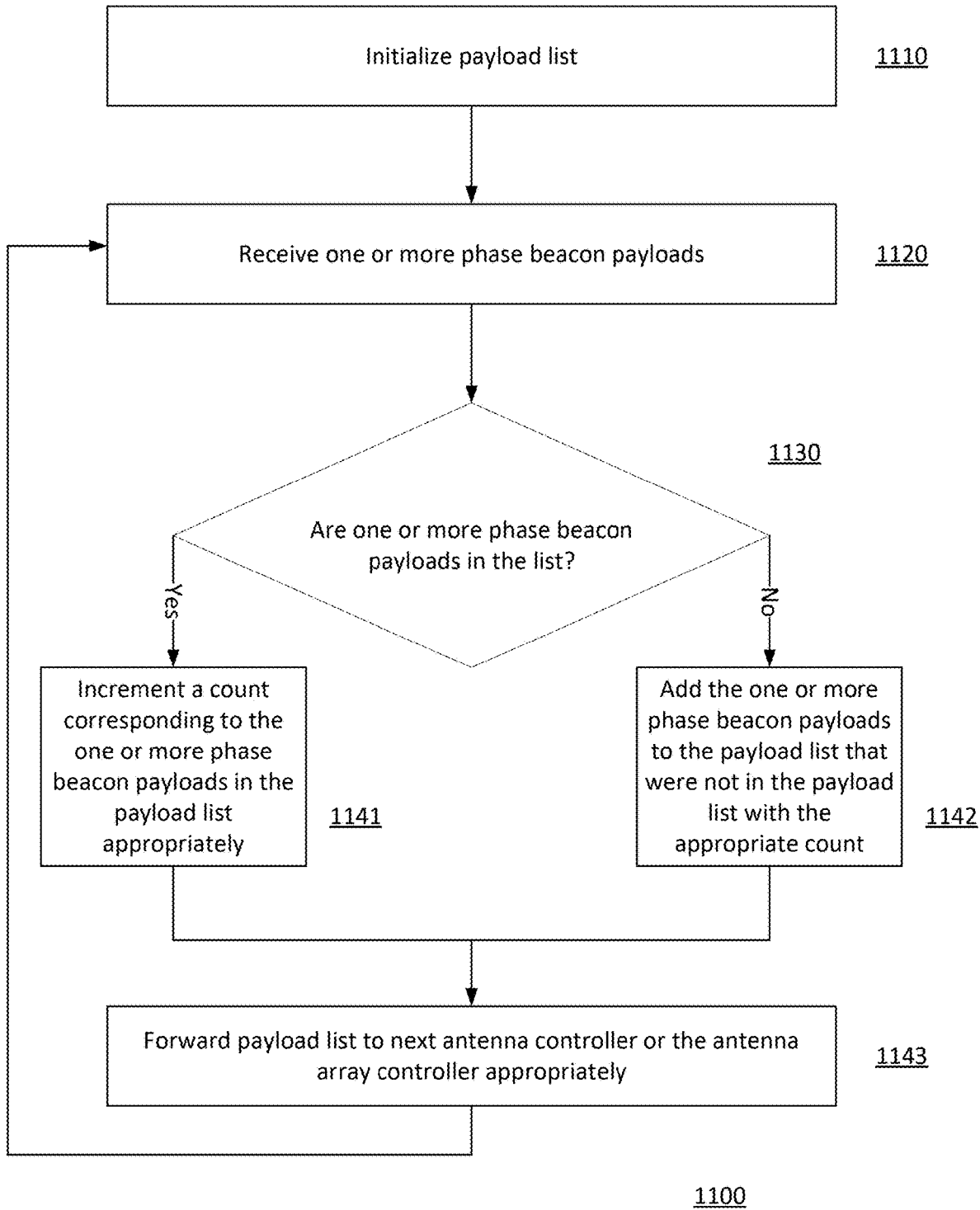
FIG. 11 is a flow diagram depicting an example method that may be performed by a WPTS or an antenna controller of a WPTS.

FIG. 11 depicts an example method that may be performed, for example, by an antenna controller of a WPTS to propagate a payload list of received WPRC information via an encoded phase beacon. At 1110, a payload list is initialized. As described above, a first antenna controller may be responsible for initializing the payload list or the antenna array controller may initialize the list. At 1120, one or more phase beacon payloads are received. As described above with respect to FIGS. 6 and 10, in one example, an antenna controller may include four AMUs and thus may receive four corresponding beacon payloads. At 1130, it may be determined whether any of the received phase beacon payloads are in the payload list. If a received phase beacon payload is in the payload list, at 1141 the antenna controller may update the list by incrementing the count for that particular phase beacon payload appropriately. If a received phase beacon payload is not in the payload list, at 1142 the antenna controller may add the phase beacon payload to the list with an appropriate count corresponding to the number of antennas at which the phase beacon payload was received. In one example, the phase beacon payloads may be equivalently viewed as being received at a number of AMUs. In one example, if there is no more room in the payload list, the received phase beacon payload may be discarded. In another example, the payload list may be grown to accommodate a new received phase beacon payload by adding a new row to the payload list. If the payload list is grown, a "last flag," such as that described above with respect to FIG. 10, may be shifted down to the newly added row. At 1143, the current antenna controller may forward the payload list to a next antenna controller if the current antenna controller is not the last antenna controller in the daisy chain. If the current antenna controller is the last in the daisy chain, the current antenna controller may forward the payload list to the antenna array controller which may then receive a payload list that has been aggregated across all of the antenna controllers on the daisy chain.

It should be noted that the example method and particular order of steps depicted in FIG. 11 is not meant to be limiting. The steps as depicted in FIG. 11 may be rearranged, combined, omitted, sub-divided, or otherwise modified and still fall within the scope of the embodiments described herein.

Figure 12:
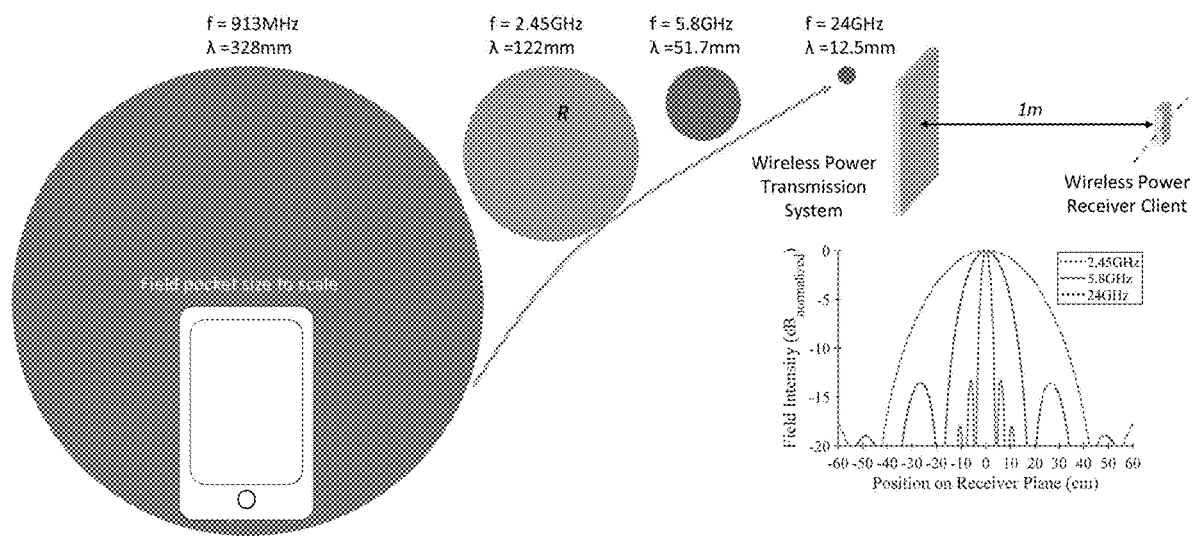
FIG. 12 depicts field pocket sizes corresponding to different wireless power transmission frequencies.

FIG. 12 depicts field pocket sizes corresponding to frequencies/wavelengths used to transmit directional wireless power from a WPTS to a WPRC that is 1 meter away. As shown in FIG. 12, as the frequency of the transmitted wireless power increases, the field pocket size decreases. As such, a WPTS transmitting wireless power at 24 GHz is capable of focusing wireless power on a smaller area than the area achievable at lower frequencies such as 5.8 GHz and 2.4 GHz. Additionally, by focusing power on a smaller area, a WPTS transmitting wireless power at 24 GHz may be able to deliver more power to a WPRC.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a WPTS or WPRC.

What is claimed is:

1. A wireless power transmission system (WPTS) for directionally transmitting wireless power to a wireless power receiver client (WPRC), the WPTS comprising:
   an antenna array controller; and
   a plurality of antenna controllers coupled to the antenna array controller via a daisy chain bus;
   wherein each antenna controller of the plurality of antenna controllers is coupled to a respective plurality of antennas, and wherein the antenna array controller is configured to control the antenna controllers to receive a phase beacon from the WPRC and to transmit wireless power to the WPRC based on information encoded in the phase beacon.

2. The WPTS of claim 1, wherein the daisy chain bus is a differential pair.

3. The WPTS of claim 1, wherein each antenna controller of the plurality of antenna controllers includes a plurality of antenna management units (AMUs), wherein each AMU includes one of the respective plurality of antennas, and wherein a single phase locked loop is shared across the one or more AMUs.

4. The WPTS of claim 3, wherein the AMU is configured to:
   when operating in a receive mode, detect phase information from the received phase beacon; and
   when operating in a transmit mode:
      program a phase of a phase shifter based on a complex conjugate of the phase information; and
      transmit wireless power to the WPRC via the phase shifter.

5. The WPTS of claim 1, wherein each antenna controller of the plurality of antenna controllers is configured to:
   update a payload list indicating the information encoded in the phase beacon; and
   forward the updated payload list on the daisy chain bus.

6. The WPTS of claim 5, wherein the updated payload list includes a count indicating how many antennas received the information encoded in the phase beacon.

7. The WPTS of claim 6, wherein the information encoded in the phase beacon includes a WPRC ID.

8. The WPTS of claim 7, wherein the updated payload list includes a list of one or more received WPRC IDs.

9. The WPTS of claim 1, wherein a timing beacon is received prior to the phase beacon.

10. The WPTS of claim 9, wherein the timing beacon is received on a frequency that is offset from a frequency used to transmit the wireless power.

11. The WPTS of claim 10, wherein the antenna array controller is further configured to control the plurality of antenna controllers to halt transmission of wireless power during a time slot corresponding to an expected receive time of the phase beacon.

12. The WPTS of claim 1, wherein the antenna array controller is further configured to send a command message to the plurality of antenna controllers using a command bus synchronized with a reference clock.

13. The WPTS of claim 12, wherein the command message is synchronized with a divided-down version of the reference clock.

14. The WTPS of claim 12, wherein each antenna controller of the plurality of antenna controllers includes a phase locked loop (PLL), and wherein the command message is used to synchronize PLLs across the plurality of antenna controllers.

15. The WPTS of claim 1, wherein the antenna array controller is configured to determine a number of the plurality of antenna controllers coupled to the daisy chain bus based on a message that propagates through the plurality of antenna controllers and is returned to the antenna array controller.

16. The WPTS of claim 15, wherein a value included in the message is incremented by each antenna controller of the plurality of antenna controllers, and wherein the antenna array controller is further configured to determine the number of the plurality of antenna controllers based on the value that is returned to the antenna array controller.

17. A method performed by a wireless power transmission system (WPTS), the method comprising:
receiving one or more phase beacon payloads at an antenna controller via a first set of antennas;
on a condition that a phase beacon payload of the one or more phase beacon payloads matches a payload in a payload list, incrementing a count corresponding to the payload in the payload list;
on a condition that the phase beacon payload does not match a payload in the payload list, adding an indication of the phase beacon payload to the payload list;
forwarding the payload list on a daisy chain bus to a next antenna controller or to an antenna array controller; and
transmitting wireless power based on the payload list.

18. The method of claim 17, further comprising on the condition that the phase beacon payload matches the payload in the payload list, incrementing the count corresponding to the payload in the payload list based on how many antennas of the first set of antennas received the phase beacon payload.

19. The method of claim 18, wherein the phase beacon payload includes a wireless power receiver client ID.

20. The method of claim 19, wherein the phase beacon payload includes an indication of a state of charge of a wireless power receiver client.

* * * * *